United States Patent
Wetterwald et al.

(10) Patent No.: US 10,009,793 B2
(45) Date of Patent: Jun. 26, 2018

(54) REVERSE INSERTION OF MANAGEMENT PACKET INTO A DETERMINISTIC TRACK

(71) Applicant: Cisco Technology, Inc., San Jose, CA (US)

(72) Inventors: Patrick Wetterwald, Mouans Sartoux (FR); Pascal Thubert, La Colle sur Loup (FR); Eric Michel Levy-Abegnoli, Valbonne (FR); Jean-Philippe Vasseur, Anchorage, AK (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 126 days.

(21) Appl. No.: 15/089,731

(22) Filed: Apr. 4, 2016

(65) Prior Publication Data

US 2017/0289847 A1 Oct. 5, 2017

(51) Int. Cl.
*H04W 28/08* (2009.01)
*H04L 5/00* (2006.01)
*H04W 52/02* (2009.01)

(52) U.S. Cl.
CPC ........... *H04W 28/08* (2013.01); *H04L 5/0055* (2013.01); *H04W 52/0203* (2013.01); *Y02D 70/00* (2018.01); *Y02D 70/144* (2018.01); *Y02D 70/22* (2018.01)

(58) Field of Classification Search
CPC ........... H04W 52/02; H04L 5/00; H04L 61/60
See application file for complete search history.

(56) References Cited

U.S. PATENT DOCUMENTS

| | | | |
|---|---|---|---|
| 7,366,111 B2 | 4/2008 | Thubert et al. | |
| 7,593,377 B2 | 9/2009 | Thubert et al. | |
| 7,885,274 B2 | 2/2011 | Thubert | |
| 7,886,075 B2 | 2/2011 | Molteni et al. | |
| 8,724,718 B2* | 5/2014 | Lin | H04L 5/0048 375/260 |
| 9,456,444 B2* | 9/2016 | Thubert | H04W 72/0446 |
| 2012/0236812 A1* | 9/2012 | Chen | H04L 1/1685 370/329 |

(Continued)

OTHER PUBLICATIONS

Wang et al., "6TiSCH Operation Sublayer (6top) Interface", [online], Jul. 6, 2015, [retrieved on Jan. 27, 2016]. Retrieved from the Internet: <URL: https://tools.ietf.org/pdf/draft-ietf-6tisch-6top-interface-04.pdf>, pp. 1-34.

(Continued)

*Primary Examiner* — Xavier Szewai Wong
(74) *Attorney, Agent, or Firm* — Leon R. Turkevich

(57) ABSTRACT

In one embodiment, a method comprises a first wireless network device identifying a deterministic receive slot reserved for reception of a first data packet from a second wireless network device along a deterministic track in a deterministic network; the first wireless network device transmitting an acknowledgement in the deterministic receive slot, to the second wireless network device, in response to successful reception of the first data packet in the deterministic receive slot; the first network device transmitting a second data packet in the deterministic receive slot, following the acknowledgement, to the second network device.

20 Claims, 5 Drawing Sheets

(56) References Cited

U.S. PATENT DOCUMENTS

| | | | | |
|---|---|---|---|---|
| 2014/0307604 | A1* | 10/2014 | Kikuzuki | H04W 52/0216 |
| | | | | 370/311 |
| 2015/0003468 | A1 | 1/2015 | Thubert et al. | |
| 2015/0078333 | A1 | 3/2015 | Byers et al. | |
| 2016/0269096 | A1 | 9/2016 | Thubert et al. | |
| 2017/0251468 | A1* | 8/2017 | Thubert | H04W 72/0446 |
| 2017/0265180 | A1* | 9/2017 | Bergqvist | H04W 72/0413 |
| 2017/0289846 | A1* | 10/2017 | Wetterwald | H04W 28/065 |

OTHER PUBLICATIONS

Thubert, Ed., "An Architecture for IPv6 over the TSCH mode of IEEE 802.15.4", [online], Nov. 26, 2015, [retrieved on Jan. 27, 2016]. Retrieved from the Internet: <URL: https://tools.ietf.org/pdf/draft-ietf-6tisch-architecture-09.pdf>, pp. 1-47.

Sudhaakar et al., "6TiSCH Resource Management and Interaction using CoAP", [online], Mar. 9, 2015, [retrieved on Jan. 27, 2016]. Retrieved from the Internet: <URL: https://tools.ietf.org/pdf/draft-ietf-6tisch-coap-03.pdf>, pp. 1-16.

Vilajosana et al., "Minimal 6TiSCH Configuration", [online], Jan. 16, 2016, [retrieved on Jan. 27, 2016]. Retrieved from the Internet: <URL: https://tools.ietf.org/pdf/draft-ietf-6tisch-minimal-14.pdf>, pp. 1-28.

Palattella, et al., "Terminology in IPv6 over the TSCH mode of ISSS 802.15.4e", [online], Nov. 2, 2015, [retrieved on Jan. 27, 2016]. Retrieved from the Internet: <URL: https://tools.ietf.org/pdf/draft-ietf-6tisch-terminology-06.pdf>, pp. 1-14.

Winter, et al., " RPL: IPv6 Routing Protocol for Low-Power and Lossy Network", Internet Engineering Task (IETF), Request for Comments: 6550, Mar. 2012, pp. 1-157.

Watteyne, et al., "Using IEEE 802.15.4e Time-Slotted Channel Hopping (RSCH) in the Internet of Things (IoT): Problem Statement", Internet Engineering Task Force (IETF), Request for Comments: 7554, May 2015, pp. 1-23.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

TTTech, "Time-Triggered Ethernet—A Powerful Network Solution for Multiple Purpose", [online], [retrieved on Feb. 11, 2016]. Retrieved from the Internet: <URL: https://www.tttech.com/download/technologies/deterministic-ethernet/time-triggered-ethernet/?file=%2Ffileadmin%2Fcontent%2Fgeneral%2Fsecure%2FTTEthernet%2FTTTech_TTEthernet_Technical-Whitepaper.pdf&hash=0560afac568e8db0ee899519f1f95b4b&eID=fileDownload>, pp. 1-14.

Wikipedia, "Generalized Multi-Protocol Label Switching", [online], Aug. 18, 2014, [retrieved on Feb. 4, 2016]. Retrieved from the Internet: <URL: https://en.wikipedia.org/w/index.php?title=Generalized_Multi-Protocol_Label_Switching&printable=yes>, pp. 1-2.

Thubert et al., U.S. Appl. No. 14/642,066, filed Mar. 9, 2015.
Levy-Abegnoli et al., U.S. Appl. No. 14/816,108, filed Aug. 3, 2015.
Thubert et al., U.S. Appl. No. 15/009,872, filed Jan. 29, 2016.
Wetterwald et al., U.S. Appl. No. 15/089,711, filed Apr. 4, 2016.
Thubert et al., U.S. Appl. No. 15/055,690, filed Feb. 29, 2016.

Braden et al., "Resource ReSerVation Protocol (RSVP)—Version 1 Functional Specification", Network Working Group, Request for Comments: 2205, Sep. 1997, pp. 1-112.

Farrel et al., "Inter-Domain MPLS and GMPLS Traffic Engineering—Resource Reservation Protocol-Traffic Engineering (RSVP-TE) Extensions", Network Working Group, Request for Comments: 5151, pp. 1-25.

Wikipedia, "Audio Video Bridging", [online], Feb. 25, 2016, [retrieved on Mar. 10, 2016]. Retrieved from the Internet: <URL: https://en.wikipedia.org/w/index.php?title=Audio_Video_Bridging&printable=yes>, pp. 1-10.

Farrel et al., "Inter-Domain MPLS and GMPLS Traffic Engineering—Resource Reservation Protocol-Traffic Engineering (RSVP-TE) Extensions", Network Working Group, Request for Comments: 5151, Feb. 2008, pp. 1-25.

* cited by examiner

US 10,009,793 B2

REVERSE INSERTION OF MANAGEMENT PACKET INTO A DETERMINISTIC TRACK

TECHNICAL FIELD

The present disclosure generally relates to reverse insertion of a management packet into a deterministic track.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal packet loss). For example, Low power and Lossy Networks (LLNs) allow a large number (e.g., tens of thousands) of resource-constrained devices to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and channel hopping for higher reliability.

The 6TiSCH architecture specifies a Channel distribution/usage (CDU) matrix of "cells", each cell representing a unique wireless channel at a unique timeslot. The 6TiSCH architecture also specifies installation of a track allocating a sequence of cells for each hop along a path from a source to a destination, for deterministic forwarding of a data packet. Loss of the data packet along the track, however, results in unused cells "downstream" of the network device that lost the data packet. There is no way, however, to send a data packet "upstream" back toward the source of the data packet using the track in the reverse direction.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

OVERVIEW

In one embodiment, a method comprises a first wireless network device identifying a deterministic receive slot reserved for reception of a first data packet from a second wireless network device along a deterministic track in a deterministic network; the first wireless network device transmitting an acknowledgement in the deterministic receive slot, to the second wireless network device, in response to successful reception of the first data packet in the deterministic receive slot; the first network device transmitting a second data packet in the deterministic receive slot, following the acknowledgement, to the second network device.

In another embodiment, an apparatus comprises a wireless interface circuit, and a processor circuit. The processor circuit is configured for identifying a deterministic receive slot reserved for reception, by the apparatus operating as a first wireless network device, of a first data packet from a second wireless network device along a deterministic track in a deterministic network. The processor circuit further is configured for causing transmission, by the wireless interface circuit, of an acknowledgement in the deterministic receive slot to the second wireless network device in response to successful reception of the first data packet in the deterministic receive slot. The processor circuit further is configured for causing transmission of a second data packet in the deterministic receive slot, following the acknowledgement, to the second network device.

In another embodiment, one or more non-transitory tangible media is encoded with logic for execution by a machine, and when executed by the machine operable for: the machine, implemented as a first wireless network device, identifying a deterministic receive slot reserved for reception of a first data packet from a second wireless network device along a deterministic track in a deterministic network; the first wireless network device transmitting an acknowledgement in the deterministic receive slot, to the second wireless network device, in response to successful reception of the first data packet in the deterministic receive slot; and the first network device transmitting a second data packet in the deterministic receive slot, following the acknowledgement, to the second network device.

DETAILED DESCRIPTION

Particular embodiments enable a wireless network device, having received a data packet from a transmitting network device within a deterministic receive slot reserved for reception of the data packet, to transmit a second data packet back to the transmitting network device using available time following an acknowledgement in the deterministic receive slot. Hence, the example embodiments provide a bidirectional deterministic track between a source network device and a destination network device, where a second data packet can be transmitted in the same direction and in the same deterministic receive slot as an acknowledgement.

Figure 1:
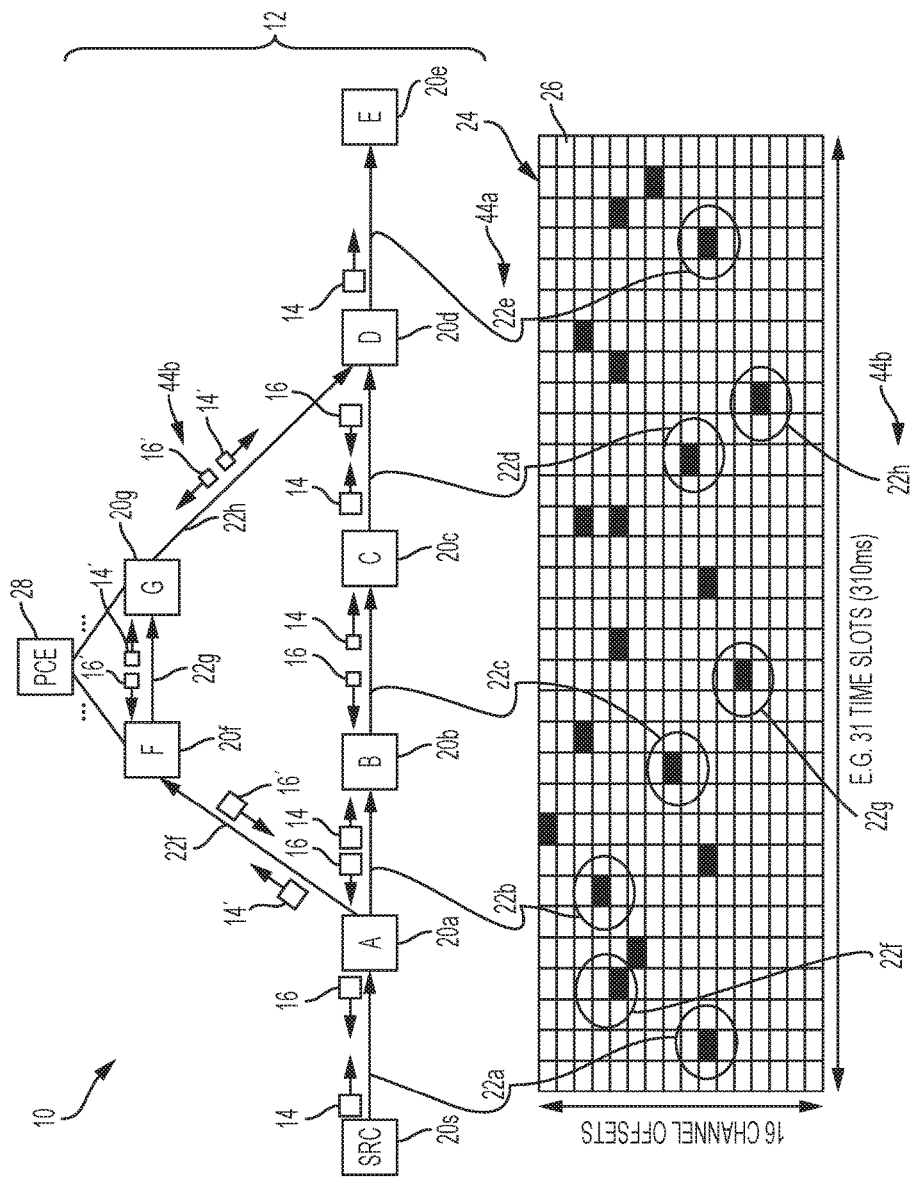
FIG. 1 illustrates an example system having an apparatus for selectively generating and transmitting, in a deterministic receive slot reserved for reception of a first data packet from a transmitting network device along a deterministic track, a second data packet following acknowledgement of the first data packet, according to an example embodiment.

FIG. 1 illustrates an example deterministic network system (i.e., deterministic network) 10 providing a deterministic track 12 for deterministic forwarding of a data packet 14, and selective reverse insertion of a second data packet 16 by a network device 20 into the deterministic track 12 in response to a detected event such as a detected management event (i.e., condition), according to an example embodiment. The deterministic track 12 is based on allocation of allocated cells 22 from a repeating CDU matrix 24 (i.e., repeating deterministic schedule) having a plurality of cells 26, each cell 26 representing a unique wireless channel at a unique timeslot. As illustrated in FIG. 1, the CDU matrix 24 (e.g., implemented according to 6TiSCH) can provide sixteen (16) wireless channels over thirty-one (31) ten millisecond (10 ms) timeslots, providing a total instance duration of 310 ms. Hence, the CDU matrix 24 provides a repeatable deterministic schedule (i.e., a repeating distribution of deterministic slots such as cells 26), enabling establishment of deterministic tracks 12 in the deterministic network 10 for different data flows among different network devices 20. Hence, the repeating CDU matrix 24 enables the source network device "SRC" 20*e* to transmit another data packet 14 (e.g., of an identified flow) on each successive instance of the deterministic track 12 in the corresponding instance of the CDU matrix 24.

Particular embodiments address a concern that can arise in use of a hop-by-hop deterministic track 12 for deterministic forwarding of the data packet 14 originated by a source network device (e.g., "SRC" 20*s*) and destined for a destination network device "E" 20*e* in a deterministic network 10, namely the ability to send a reverse data packet (e.g., a management packet) 16 in the "upstream" direction along a deterministic track 12 toward the source 20*s* of the data packet 14. Conventional implementations of a deterministic track 12 (e.g., Generalized Multi-protocol Label Switching (G-MPLS) according to the 6TiSCH architecture) assume that an allocated cell 22 (comprising a unique wireless channel at a unique timeslot) is reserved exclusively for deterministic transmission of the data packet 14 "downstream" from the source network device "SRC" 20*s* toward the destination device "E" 20*e*, and transmission of an acknowledgement (18 of FIG. 2) from the receiving network device in response to successful reception of the data packet 14. Hence, the assumed exclusive reservation of the allocated cell 22 for a data packet 14 and its corresponding acknowledgement 18 created the problem of no ability for a wireless network device 20 along the deterministic track 12 to transmit a data packet back to the source network device "SRC" 20*s*, for example to notify the source network device "SRC" 20*s* of a "management" condition.

According to an example embodiment, a receiving network device 20 (e.g., "D" 20*d*) can respond to receiving a data packet 14, transmitted in an allocated cell 22 (e.g., 22*d*) by a transmitting network device (e.g., "C" 20*c*), by selectively generating a second data packet 16 in response to a detected condition and transmitting the second data packet 16 using the same allocated cell 22 (e.g., 22*d*) that was reserved for reception of the data packet 14 from the transmitting network device (e.g., "C" 20*c*) by the receiving network device 20 (e.g., "D" 20*d*).

Figure 2:
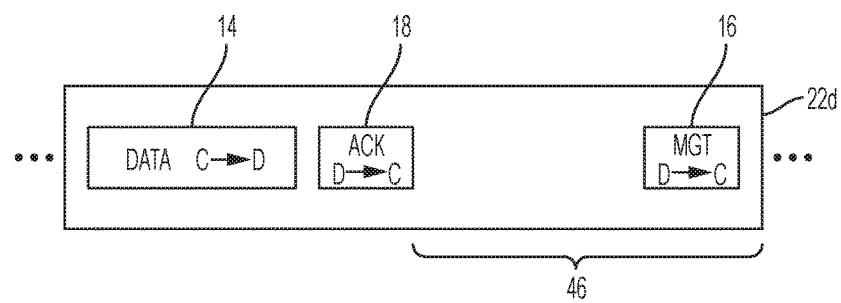
FIG. 2 illustrates an example deterministic receive slot including a second data packet transmitted by the apparatus of FIG. 1, following acknowledgement of the first data packet transmitted by the transmitting network device, according to an example embodiment.

FIG. 2 illustrates an example receive slot 22*d* reserved for reception, by a network device "D" 20*d*, of the first data packet "DATA C→D" 14 from a transmitting wireless network device "C" 20*c*, according to an example embodiment. As illustrated in FIG. 2, the wireless network device "D" 20*d* can transmit, within the receive slot 22*d*, the second data packet "MGT D→C" 16 following transmission of the acknowledgement "ACK D→C" 18 identifying reception of the first data packet 14. The receive slot 22*d* is illustrated as providing a duration of ten (10) milliseconds, enabling the reverse insertion of the second data packet 16 in the receive slot 22*d* following the first data packet 16 and the acknowledgement 18.

The second data packet 16 can be any data packet that has a size that does not exceed the available time in the receive slot 22*d* following the acknowledgement 18 (and any required interframe spacing), and that does not require deterministic forwarding according to a guaranteed schedule. The second data packet 16 can be implemented, for example, as an Operations, Administration, and Maintenance (OAM) frame. Hence, the receiving network device 20 (e.g., "D" 20*d*) can exploit the available time 46 following the acknowledgement 18 for "reverse insertion" of the second data packet 16 for transmission "upstream" along the deterministic track 12 back toward the source network device "SRC" 20*s*. Although FIG. 2 illustrates the acknowledgement 18 and the second data packet 16 as distinct data structures, the second data packet 16 also can be appended to the acknowledgement 18 to form a single data structure transmitted by the receiving network device 20, such that the single data structure comprises the acknowledgement 18 and the second data packet 16 following the acknowledgement.

As described with below respect to FIG. 5, the second data packet 16 can identify one or more attributes associated with any detected event or condition that may be beneficial to any network device "upstream" along the deterministic track 12, for example error conditions detected "downstream" along the deterministic track 12 (e.g., bit error rate, wireless interference, etc.), traffic conditions along a segment 44*a* or 44*b* of the deterministic track 12, or a control packet from the destination device 20*e* to the source network device "SRC" 20*s* instructing the source network device 20*s* to reduce, pause, stop, or resume the data flow.

Hence, the example embodiments provide an in-band second data packet 16 specifying attributes that can be used by an upstream network device in either changing the transmission of the data packet 14 in an identified flow, or changing either the deterministic track 12 or a segment 44 of the deterministic track 12.

As illustrated in FIG. 1, each of the allocated cells 22*a*, 22*b*, 22*c*, 22*d*, 22*e*, 22*f*, 22*g*, and 22*h* of the deterministic track 12 are allocated from the CDU matrix 24, each allocated cell 22 corresponding to a unique cell 26. The CDU matrix 24 can be generated by a central controller such as a path computation element (PCE) 28. The repeatable CDU matrix 24 is illustrated as encompassing sixteen (16) frequency channel offsets over thirty-one (31) 10 millisecond (ms) timeslots identified by timeslot offsets (e.g., an Absolute Slot Number (ASN)) relative to an epochal start of time. In one embodiment, the deterministic track 12 can be generated by the PCE 28; in another embodiment, the deterministic track 12 can be generated in a distributed manner between the network devices 20 (e.g., using RSVP-TE).

The deterministic track 12 can comprise deterministic segments 44*a* and 44*b* that can be allocated for deterministic forwarding of the data packet 14 to the destination network device 20*e*. The deterministic segment 44*a* comprises the allocated cells 22*a*, 22*b*, 22*c*, 22*d*, and 22*e*.

The allocated cell 22*a* is allocated for transmission by the source network device "SRC" 20*s* to the network device 20*a*; the allocated cell 22*b* is allocated for transmission by the network device 20*a* to the network device 20*b*; the allocated cell 22*c* is allocated for transmission by the network device 20*b* to the network device 20*c*; the allocated cell 22*d* is allocated for transmission by the network device 20c to the network device 20d; and the allocated cell 22e is allocated for transmission by the network device 20d to the network device 20e.

A second deterministic segment 44b can be established (e.g., in parallel with the first deterministic segment 44a) as part of a packet replication-and-elimination operation deployment, where the network device 20a is the "replication node" configured for generating a replicated copy 14' of the data packet 14, and the network device 20d is the "elimination node" that eliminates transmission of a duplicate copy of the data packet 14.

The deterministic segment 44b comprises the allocated cells 22f, 22g, and 22h and can be established by the PCE 28 and/or among the different network devices 20. Hence, the network device 20a can generate a replicated data packet 14' in response to receiving the data packet 14, and transmit the data packet 14' to the network device 20f using the allocated cell 22f; the network device 20f can forward the replicated data packet 14' to the network device 20g using the allocated cell 22g; and the network device 20g can forward the replicated data packet 14' to the network device 20d using the allocated cell 22h.

Although not illustrated in FIG. 1, the first deterministic segment 44a and the second deterministic segment 44b can be joined by additional interconnecting deterministic links (e.g., link "B-F" interconnecting network devices 20b and 20f; link "C-G" interconnecting network devices 20c and 20g), enabling formation of the deterministic track 12' to resemble a "ladder" structure.

In one embodiment, an allocated cell 22 could be implemented as merely a "timeslot" for a fixed wireless channel, hence a given allocated cell 22 also can be referred to herein as a "deterministic transmit slot" (for use by a transmitting network device transmitting a data packet 14), a "deterministic receive slot" (for use by a receiving network device receiving a data packet 14), or more generally the allocated cell 22 can be referred to herein as a "deterministic slot".

As described below with respect to FIG. 4, the network device 20d can be configured as an "elimination" node that utilizes the redundancy of the multiple deterministic segments 44a and 44b in a deterministic track 12' for reception of at least one of the data packet 14 (via the deterministic segment 44a) or the replicated data packet 14' (via the deterministic segment 44b): if the network device 20d receives both the data packet 14 and the replicated data packet 14', the network device 20d can eliminate one of the redundant data packets (e.g., the replicated data packet 14'), and forward the data packet 14 via the allocated cell 22e.

As illustrated in FIG. 1, the network device 20d can send a second data packet 16 to the transmitting network device "C" 20c within the receive slot 22d along the deterministic segment 44a of the deterministic track 12, and/or a second data packet 16' to the transmitting network device "G" 20g within the receive slot 22h along the deterministic segment 44b of the deterministic track 12. Hence, the network device "D" 20d can send the second data packet 16 or 16' as management packets along the respective segments 44a or 44b, for example for management of the replication and elimination operations along the deterministic track 12.

Figure 3:
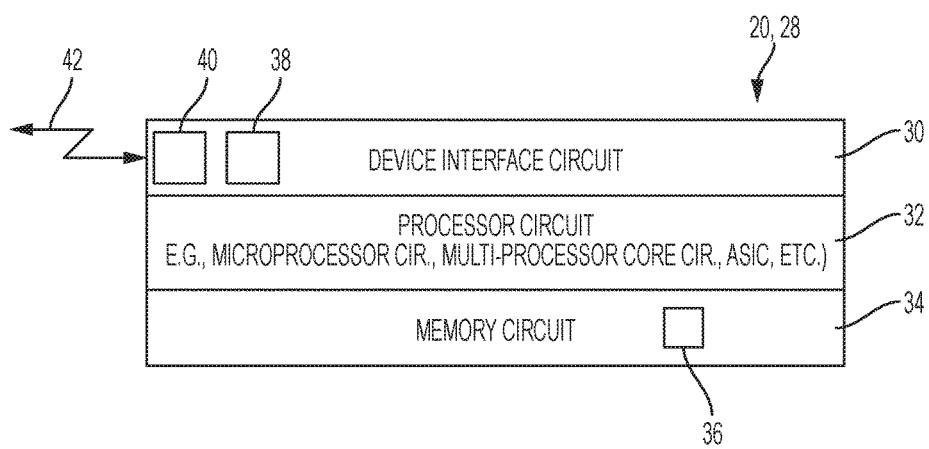
FIG. 3 illustrates an example implementation of any one of the devices of FIG. 1.

FIG. 3 illustrates an example implementation of any one of the devices 20 and/or 28 of FIG. 1, according to an example embodiment. The apparatus 20 and/or 28 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation.

Each apparatus 20 and/or 28 can include a device interface circuit 30, a processor circuit 32, and a memory circuit 34. The device interface circuit 30 can include a media access control (MAC) circuit 38 and one or more distinct physical layer transceiver (PHY) circuits 40 for communication with any one of the other devices 20 and/or 28; for example, MAC circuit 38 and/or the PHY circuit 40 of the device interface circuit 30 can be implemented as an IEEE based Ethernet transceiver (e.g., IEEE 802.1 TSN, IEEE 802.15.4e, DetNet, etc.) for communications with the devices of FIG. 1 via any type of data link 42, as appropriate (e.g., a wired or wireless link, an optical link, etc.). The processor circuit 32 can be configured for executing any of the operations described herein, and the memory circuit 34 can be configured for storing any data or data packets as described herein, for example in a data structure 36.

Any of the disclosed circuits of the devices 20 and/or 28 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/ packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 4A:
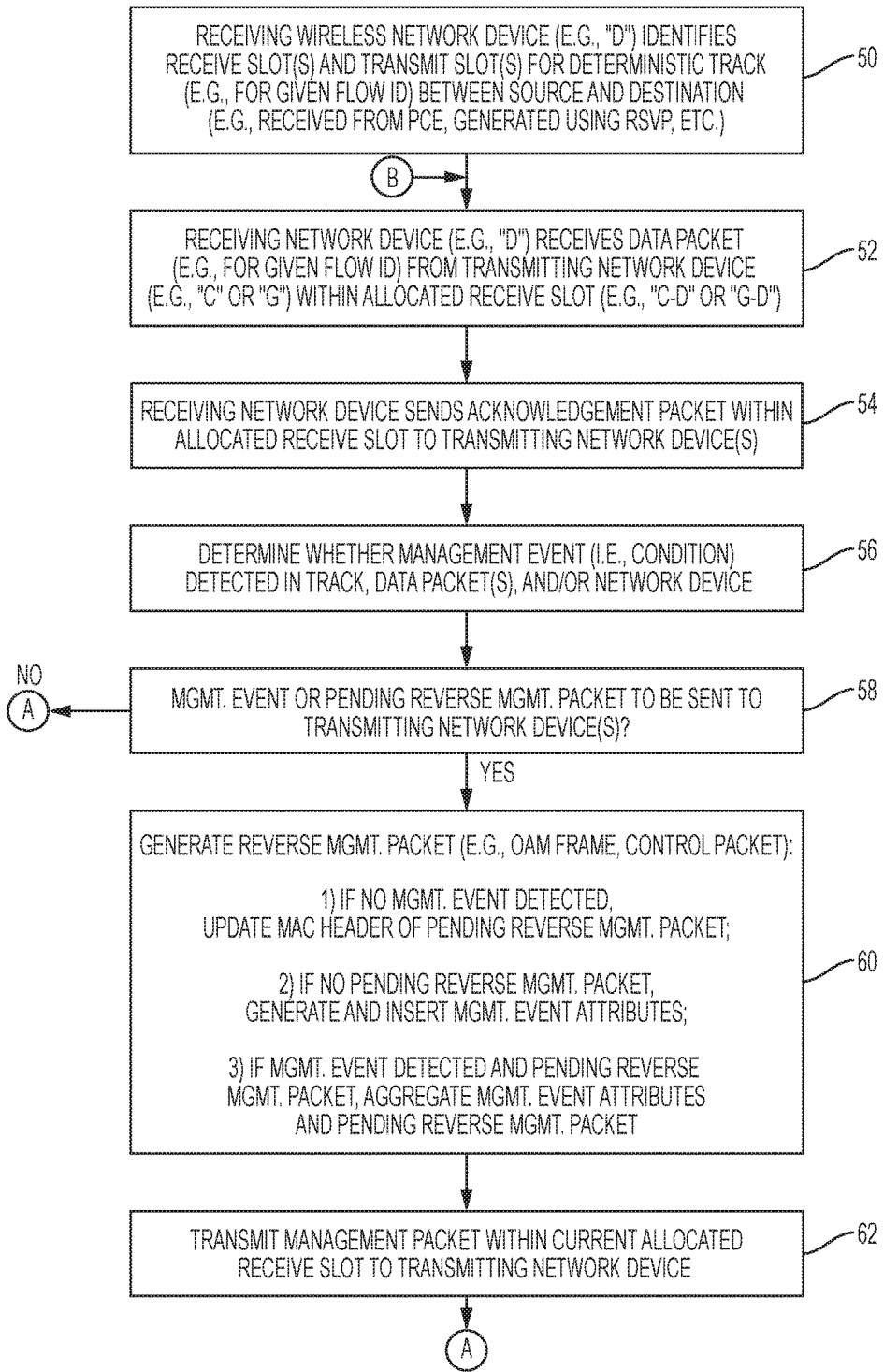
FIGS. 4A and 4B illustrate an example method of selectively generating and transmitting, in a deterministic receive slot reserved for reception of a first data packet from a transmitting network device along a deterministic track, a second data packet following acknowledgement of the first data packet, according to an example embodiment.
Figure 4B:
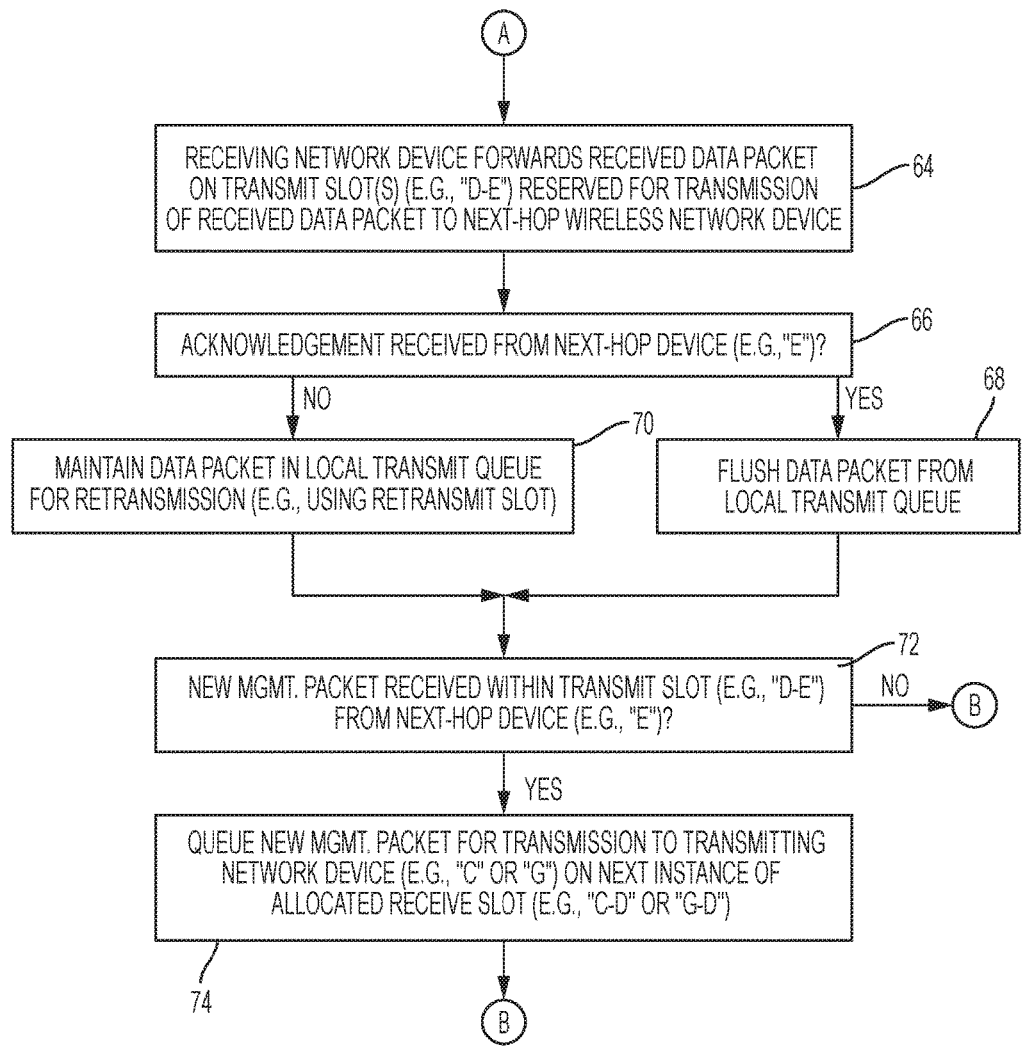

FIGS. 4A and 4B illustrate an example method of a network device 20 generating and transmitting a second data packet 16, in a deterministic receive slot, according to an example embodiment. In particular, FIGS. 4A and 4B illustrate an example method of selectively generating and transmitting, in a deterministic receive slot reserved for reception of a first data packet from a transmitting network device along a deterministic track, a second data packet following acknowledgement of the first data packet, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, the deterministic track 12 can be established based on the network devices 20 identifying in operation 50 their associated deterministic transmit slot 22 and/or deterministic receive slot 22 for deterministic forwarding of the data packet 14 through the deterministic network 10. For example, the processor circuit 32 in the source network device "SRC" 20s is configured for identifying allocation of a deterministic transmit slot 22a for deterministic transmission of the data packet 14 toward the destination network device "E" 20e via the next-hop network device 20a, and the processor circuit 32 in the destination network device "E" 20e is configured for identifying in operation 50 allocation of a deterministic receive slot 22e for deterministic reception of the data packet 14 via a deterministic track 12. The processor circuit 32 in each intermediate network device 20 (e.g. 20a, 20b, 20c, 20d, 20f, 20g) is configured for identifying in operation 50, as part of formation of the corresponding deterministic track 12, allocation of one or more deterministic receive slots 22 (e.g., 22d and/or 22h for network device 20d) reserved for receiving the data packet 14 (and/or 14') from a transmitting network device (e.g., 20c and/or 20g), and a deterministic transmit slot 22 (e.g., 22d for network device 20c; 22h for network device 20g), for transmitting the data packet 14 toward the destination network device 20e along the deterministic track 12.

The deterministic track 12 can be established between a source network device and a destination network device, for example, based on flow identifier for an identified flow of data packets. The deterministic track 12 can be established centrally by a central controller such as the PCE 28, for example based on a network device 20 receiving from the PCE 28 a message specifying the deterministic transmit slot and deterministic receive slot allocated to the network device 20, enabling the network device 20 to deterministically receive and forward the data packet 14. The establishment of the deterministic track 12 also can be distributed between the network device 20, for example according to Resource Reservation Protocol (RSVP) according to RFC 2205, Resource Reservation-Traffic Engineering Protocol (RSVP-TE) according to RFC 5151, etc. Hence, the processor circuit 32 in each network device 20 can identify the allocated cells 22, as appropriate, either based on received instructions from the PCE 28 or based on a request-response protocol along a given path between the source network device and destination network device, for example using RSVP-TE.

Hence, the processor circuit 32 of the network device 20d can be configured for identifying in operation 50 allocation of the allocated cell 22h as a deterministic receive slot reserved for reception of a replicated copy 14' of the data packet 14, from the network device 20g associated with forwarding the data packet along the second deterministic segment 44b. Hence, the network device 20d, illustrated as an "elimination node", can identify that it can receive the data packet 14 from the network device 20c at the allocated cell 22d, or the replicated copy 14' of the data packet from the network device 20g at the allocated cell 22h.

The forwarding of the data packet 14 along the deterministic track 12 can be executed for each instance of the CDU matrix 24, where the network device "SRC" 20s can transmit the data packet 14 to the network device 20a at the allocated cell 22a.

The processor circuit 32 of each receiving network device (e.g., 20a, 20b, 20c, 20d, 20f, and 20g) in operation 52 attempts detection of the data packet 14 (and/or its replicated copy 14') at the initiation of the allocated receive slot from the transmitting network device. For example, the elimination node 20d can attempt in operation 52 to detect the data packet 14 (for a given flow identification) transmitted by the network device "C" 20c within the receive slot "C-D" 22d, and/or the replicated copy 14' transmitted by the network device "G" 20g within the receive slot "G-D" 22h.

Assuming the receiving network device (e.g., 20d) receives the data packet 14 from its transmitting network device (e.g., 20c) during the allocated receive slot (e.g., 22d), the processor circuit 32 of the receiving network device (e.g., 20d) in operation 54 generates an acknowledgement 18 as illustrated in FIG. 2, and the processor circuit 32 causes the device interface circuit 30 to transmit the acknowledgement 18 in the allocated receive slot (e.g., 22d) to the transmitting network device (e.g., "C" 20c). (As described below, actual transmission of the acknowledgement 18 can be deferred until operations 58 or 60 to determine whether a second data packet 16 is to follow the acknowledgement).

The processor circuit 32 of the receiving network device (e.g., 20d) can determine in operation 56 whether a management event (i.e., a condition) has been detected, where the management event (i.e., condition) can be associated with the deterministic track 12, any of the segments 44a and/or 44b, or the receiving network device (e.g., 20d). For example, the processor circuit 32 of the receiving network device (e.g., 20d) can store, in the data structure 36, management information base (MIB) statistics describing any relevant attribute, described in further detail below with respect to FIG. 5.

The processor circuit 32 of the receiving network device (e.g., 20d) in operation 58 can determine whether any management event is detected (from operation 56) or whether there is any pending second data packet (i.e., "pending reverse management packet") already received from a "downstream" network device and stored in its transmit queue in the memory circuit 34; as described in detail below with respect to FIG. 4B, the receiving network device (e.g., 20d) could have previously received and stored in its transmit queue a "second" data packet 16 (e.g., a management packet) from a successive next-hop wireless network device (e.g., 20e) within a prior instance of a deterministic transmit slot (e.g., 22e) in a corresponding prior instance of the deterministic track 12.

If in operation 58 the processor circuit 32 of the receiving network device (e.g., 20d) identifies a detected management event (i.e., condition) and/or a pending reverse management packet to be sent to the transmitting network device (e.g., 20c), the processor circuit 32 of the receiving network device (e.g., 20d), the processor circuit 32 of the receiving network device (e.g., 20d) in operation 60 can generate a reverse management packet 16, and cause the device interface circuit 30 of the receiving network device (e.g., 20d) to transmit in operation 62 the reverse management packet 16 to the transmitting network device (e.g., "C" 20c) in the same allocated receive slot (e.g., 22d) as the received data packet 14 and the transmitted acknowledgement 18, as illustrated in FIG. 2. As described previously, the second data packet 16 can be appended to the acknowledgement 18 to form a single data structure; the acknowledgement 18 and the second data packet 16 can be transmitted as distinct data structures in the receive slot (e.g., 22d), in which case a bit can be set in the acknowledgement 18 to notify the transmitting network device (e.g., 20c) of the second data packet 16 following the acknowledgement 18 in the receive slot (e.g., 22d).

The processor circuit 32 of the receiving network device (e.g., 20d) can generate and transmit the reverse management packet 16 based on various detected conditions. For example, if no management event was detected in operation 56 but the receiving network device (e.g., 20d) has a previously-received reverse management packet 16 stored in its transmit queue, the processor circuit 32 of the receiving network device (e.g., 20d) can update the link layer header (e.g., Media Access Control (MAC) layer header) of the pending reverse management packet stored in its transmit queue, and cause the device interface circuit 30 to transmit in operation 62 the reverse management packet 16 in the allocated receive slot (e.g., 22d). If in operation 60 the receiving network device (e.g., 20d) contains no reverse management packet 16 in its transmit queue but contains in its data structure 36 an identification of one or more conditions (e.g., management events) detected by the receiving network device (e.g., 20d) (from operation 56), the processor circuit 32 of the receiving network device (e.g., 20d) in operation 60 can generate the reverse management packet 16 and insert the management event attributes, described below with respect to FIG. 5. If in operation 60 the processor circuit 32 of the receiving network device (e.g., 20d) detects in its data structure 36 a condition (e.g., management event) from operation 56 and a previously-received reverse management packet 16 stored in its transmit queue, the processor circuit 32 of the receiving network device (e.g., 20d) can aggregate the management event attributes stored in its data structure 36 with the pending reverse management packet 16 stored in its transmit queue, and output in operation 62 the updated reverse management packet 16 containing attributes collected from the receiving network device (e.g., 20d) and the previously-received reverse management packet 16 (e.g., from 20e).

Hence, a receiving network device (e.g., 20d) can send a second data packet 16, illustrated in FIG. 2 as a reverse management packet "MGT D→C" 16, to a transmitting network device (e.g., 20c) within the same receive slot 22d. The second data packet 16 can include locally-collected attributes and/or attributes received from a "downstream" network device (e.g., 20e) having transmitted its own management data packet 16 during a prior instance of the deterministic track 12, described below.

Referring to FIG. 4B, the processor circuit 32 of the receiving network device of FIG. 4A (e.g., 20d) in operation 64 can cause the device interface circuit 30 forward the received data packet 14 "downstream" to its next-hop successor network device (e.g., 20e) at the allocated transmit slot (e.g., 22e). As described previously with respect to operation 50, the receiving network device of FIG. 4A (e.g., 20d) can identify its deterministic transmit slot (e.g., 22e) reserved for transmission of the data packet (e.g., Data "D→ E") 14 to its next-hop successor network device (e.g., 20e) via different techniques, for example via the PCE 28, RSVP, etc.

If in operation 66 the processor circuit 32 of the receiving network device of FIG. 4A (e.g., 20d) detects an acknowledgement (e.g., "E→ D") 18 from its next-hop successor network device (e.g., 20e) within the allocated transmit slot (e.g., 22e), the processor circuit 32 in operation 68 can delete (e.g., "flush") the forwarded data packet (e.g., Data "D→ E") 14 from its transmit queue; if, however, the processor circuit 32 does not detect the acknowledgement (e.g., "E→ D") 18 within the allocated transmit slot (e.g., 22e), the processor circuit 32 of the receiving network device of FIG. 4A (e.g., 20d) in operation 70 can maintain the forwarded data packet (e.g., Data "D→ E") 14 in its transmit queue for subsequent retransmission, for example using an allocated retransmit slot from the CDU matrix 24. The processor circuit 32 of the receiving network device of FIG. 4A (e.g., 20d) in operation 70 also can update its MIB tables to identify the failed transmission as a detected condition (e.g., management event) to be reported to the source network device "SRC" 20s upon the next instance of the deterministic track 12.

Since the next-hop successor network device (e.g., 20e) can transmit its own reverse management data packet 16 within the allocated transmit slot (e.g., 22e), the processor circuit 32 of the receiving network device of FIG. 4A (e.g., 20d) can determine in operation 72 whether a reverse management data packet (e.g., "MGT E→ D") 16 was received within the allocated transmit slot (e.g., "D-E" 22e) from the next-hop successor network device (e.g., "E" 20e). In response to receiving a reverse management data packet (e.g., "MGT E→ D"), the processor circuit 32 of the receiving network device of FIG. 4A (e.g., 20d) in operation 74 can queue the new reverse management data packet (e.g., "MGT E→ D") 16 in its transmit queue in the memory circuit 34 for transmission on the next instance of an allocated receive slot (e.g., "C-D" 22d or "G-D" 22h). Note the receiving network device of FIG. 4A (e.g., 20d) can continue to wait in operations 66 and 70 for the acknowledgement from the next-hop successor network device for the duration of the allocated transmit slot.

Figure 5:
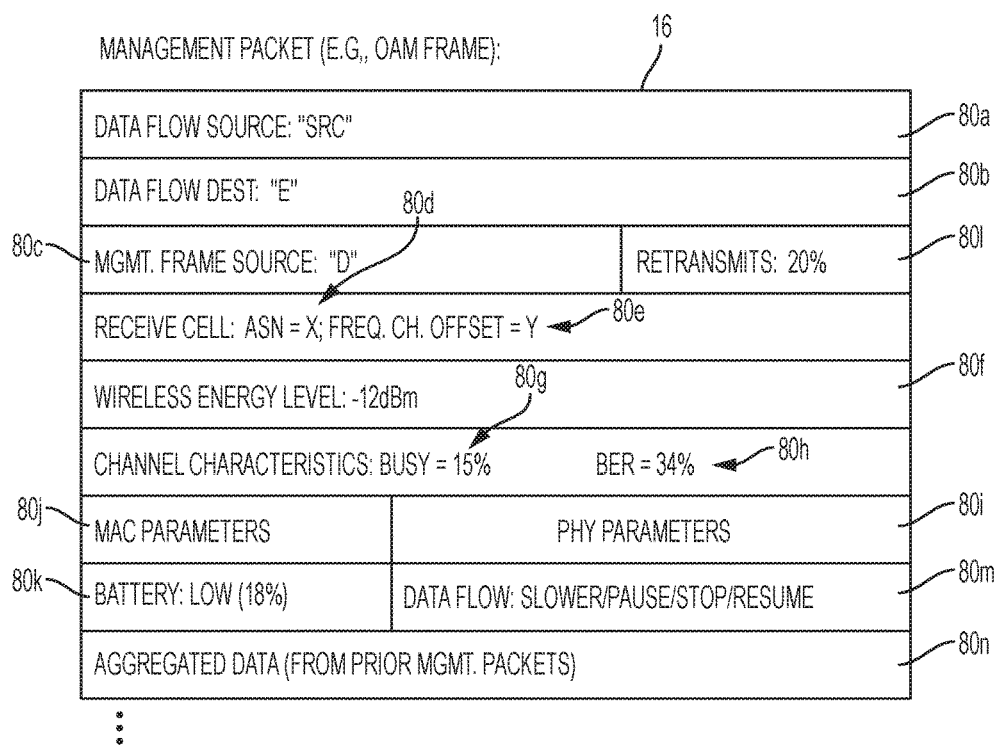
FIG. 5 illustrates an example of the second data packet of FIGS. 1 and 2, illustrated as a management packet, according to an example embodiment.

FIG. 5 illustrates an example management packet 16, according to an example embodiment. Although not shown in FIG. 5, the management packet 16 can include a packet header that identifies the type of data packet as "management"; for example, an Ethertype field in the packet header can be used to identify the packet type as "management", enabling any network device 20 to distinguish the management packet 16 from a data packet 14.

FIG. 5 illustrates that the management packet 16 identifies one or more example attributes 80 associated any one of the deterministic track 12, a wireless network device 12, or a control message destined for the source network device "SRC" 20s. Example attributes 80 can include: an identifier 80a for the data flow source 20s; an identifier 80b for the data flow destination 20e; an identifier 80c for the management frame source that generated the management packet 16 (e.g., network device "D" 20d); an identifier "X" 80d identifying the transmission time of the receive slot (e.g., 22d) relative to the prescribed time domain of the deterministic network (e.g., ASN number), and an identifier 80e identifying a frequency channel "Y" allocated for the transmission of the data packet at the receive slot (e.g., 22d).

Additional attributes 80 can be added to the management packet 16 specifying detected conditions associated with the deterministic track 12 or a specific allocated cell 22, for example an identifier 80f identifying a detected (ambient) wireless energy level detected by the first network device during the receive slot (e.g., 22d), identifiers 80g and 80h identifying detected wireless channel characteristics associated with the frequency channel "Y" in use for the receive slot (e.g., 22d), for example the identifier 80g identifying the percentage that the frequency channel was found "busy" (e.g., due to co-channel interference), or the identifier 80h identifying a bit error rate (BER).

Additional attributes 80 can be obtained from the device interface circuit 30, for example an identifier 80i identifying one or more physical layer (PHY) transceiver parameters (e.g., detected receive signal strength indicator (RSSI), etc.), or an identifier 80j identifying one or more media access control (MAC) parameters.

Additional attributes 80 can describe a condition of the wireless network device, for example a battery level indicator 80k, or a retransmit statistics indicator 80l.

The management packet 16 also can specify a control command 80m for the identified data flow, for example a request from the destination device 20e (or any other intermediate network device along the deterministic track) and destined for the source network device "SRC" 20s to reduce (i.e., slow down), pause, stop, or resume the data flow: the command can be due to a network condition in the deterministic track 12, or due to another condition (e.g., application layer request).

The management packet 16 also can specify additional aggregated data 80n, for example an accumulation of the above-identified attributes, or an accumulation (aggregation) of the above-identified attributes with a previously-received management data packet 16 from a next-hop successor network device as described previously with respect to operation 60.

According to example embodiments, a management packet 16 can be generated for reverse insertion into a deterministic track 12. The example embodiments enable establishment of a bidirectional path using a single deterministic track 12, enabling an in-band transmission of non-deterministic data packets "upstream" toward a network device transmitting data packets along a deterministic track.

Although the example embodiments illustrate a receiving network device transmitting an acknowledgement in response to receiving a first data packet within a deterministic receive slot (reserved for reception of the first data packet), the example embodiments also enable the receiving network device to transmit a "second" data packet 16 (e.g., a management packet) within the deterministic receive slot even if the transmitting network device fails to transmit the first data packet. Hence, the example embodiments enable "upstream" transmission along the data track even if one or more transmitting network devices fail to transmit the first data packet.

Although the example embodiments illustrated allocated cells with different frequency offsets at different timeslots, the example embodiments can be implemented using a time division-multiplexed system using a single frequency. Further, any one of the intermediate network devices 20 also can be implemented as a switching device providing the necessary timing and/or synchronization intervals to receive and/or transmit data packets as described with respect to the transmit or receive slots that require acknowledgement of a transmitted data packet.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
a first wireless network device identifying a deterministic receive slot reserved for reception of a first data packet, by the first wireless network device, from a second wireless network device along a deterministic track in a deterministic network, wherein the deterministic track is multi-hop and includes the deterministic receive slot;
the first wireless network device transmitting an acknowledgement in the deterministic receive slot, to the second wireless network device, in response to successful reception of the first data packet in the deterministic receive slot; and
the first network device transmitting a second data packet in the deterministic receive slot, within a remaining available time following the acknowledgement, to the second network device.

2. The method of claim 1, further comprising:
the first wireless network device identifying a deterministic transmit slot reserved for transmission of the first data packet to a third wireless network device along the deterministic track; and
the first wireless network device transmitting the first data packet, in the deterministic transmit slot, to the third wireless network device.

3. The method of claim 2, wherein:
the deterministic track is within a single instance of a repeating distribution of deterministic slots;
the method further comprises the first wireless network device receiving the second data packet, from the third wireless network device, in a prior instance of the deterministic transmit slot within a corresponding prior instance of the deterministic track.

4. The method of claim 1, wherein the second data packet is a management packet identifying one or more attributes associated with any one of the deterministic track, the first wireless network device, or any other wireless network device providing reachability for the first wireless network device to reach a destination device along the deterministic track.

5. The method of claim 1, further comprising:
the first wireless network device detecting a condition associated with any one of the deterministic track, the first data packet, or the first wireless network device;
the first wireless network device generating the second data packet in response to the detected condition.

6. The method of claim 5, wherein the condition is any one of a data flow condition on the deterministic track, a low battery condition in the first wireless network device, a transmission failure of a prior data packet along the deterministic track by the first wireless network device, or a load balancing event between the first data packet and a replicated copy of the first data packet on respective segments of the deterministic track.

7. The method of claim 1, wherein the second data packet is a control packet for controlling transmission of a data flow along the deterministic track.

8. An apparatus comprising:
a wireless interface circuit; and
a processor circuit configured for identifying a deterministic receive slot reserved for reception, by the apparatus operating as a first wireless network device, of a first data packet from a second wireless network device along a deterministic track in a deterministic network, wherein the deterministic track is multi-hop and includes the deterministic receive slot;
the processor circuit further configured for causing transmission, by the wireless interface circuit, of an acknowledgement in the deterministic receive slot to the second wireless network device in response to successful reception of the first data packet in the deterministic receive slot;
the processor circuit further configured for causing transmission of a second data packet in the deterministic receive slot, within a remaining available time following the acknowledgement, to the second network device.

9. The apparatus of claim 8, wherein:
the processor circuit is configured for identifying a deterministic transmit slot reserved for transmission of the first data packet to a third wireless network device along the deterministic track; and
the processor circuit is configured for causing transmission of the first data packet by the wireless interface circuit, in the deterministic transmit slot, to the third wireless network device.

10. The apparatus of claim 9, wherein:
the deterministic track is within a single instance of a repeating distribution of deterministic slots;
the wireless interface circuit configured for receiving the second data packet, from the third wireless network device, in a prior instance of the deterministic transmit slot within a corresponding prior instance of the deterministic track.

11. The apparatus of claim 8, wherein the second data packet is a management packet identifying one or more attributes associated with any one of the deterministic track, the first wireless network device, or any other wireless network device providing reachability for the first wireless network device to reach a destination device along the deterministic track.

12. The apparatus of claim 8, wherein:
the processor circuit is configured for detecting a condition associated with any one of the deterministic track, the first data packet, or the first wireless network device;
the processor circuit is configured for generating the second data packet in response to the detected condition.

13. The apparatus of claim 12, wherein the condition is any one of a data flow condition on the deterministic track, a low battery condition in the first wireless network device, a transmission failure of a prior data packet along the deterministic track by the first wireless network device, or a load balancing event between the first data packet and a replicated copy of the first data packet on respective segments of the deterministic track.

14. The apparatus of claim 8, wherein the second data packet is a control packet for controlling transmission of a data flow along the deterministic track.

15. One or more non-transitory tangible media encoded with logic for execution by a machine and when executed by the machine operable for:
the machine, implemented as a first wireless network device, identifying a deterministic receive slot reserved for reception, by the first wireless network device, of a first data packet from a second wireless network device along a deterministic track in a deterministic network, wherein the deterministic track is multi-hop and includes the deterministic receive slot;
the first wireless network device transmitting an acknowledgement in the deterministic receive slot, to the second wireless network device, in response to successful reception of the first data packet in the deterministic receive slot; and
the first network device transmitting a second data packet in the deterministic receive slot, within a remaining available time following the acknowledgement, to the second network device.

16. The one or more non-transitory tangible media of claim 15, further operable for:
identifying a deterministic transmit slot reserved for transmission of the first data packet to a third wireless network device along the deterministic track;
transmitting the first data packet, in the deterministic transmit slot, to the third wireless network device, wherein the deterministic track is within a single instance of a repeating distribution of deterministic slots; and
receiving the second data packet, from the third wireless network device, in a prior instance of the deterministic transmit slot within a corresponding prior instance of the deterministic track.

17. The one or more non-transitory tangible media of claim 15, wherein the second data packet is a management packet identifying one or more attributes associated with any one of the deterministic track, the first wireless network device, or any other wireless network device providing reachability for the first wireless network device to reach a destination device along the deterministic track.

18. The one or more non-transitory tangible media of claim 15, further operable for:
detecting a condition associated with any one of the deterministic track, the first data packet, or the first wireless network device;
generating the second data packet in response to the detected condition.

19. The one or more non-transitory tangible media of claim 18, wherein the condition is any one of a data flow condition on the deterministic track, a low battery condition in the first wireless network device, a transmission failure of a prior data packet along the deterministic track by the first wireless network device, or a load balancing event between the first data packet and a replicated copy of the first data packet on respective segments of the deterministic track.

20. The one or more non-transitory tangible media of claim 15, wherein the second data packet is a control packet for controlling transmission of a data flow along the deterministic track.

* * * * *